J. GUTH.
AGRICULTURAL TRACTOR.
APPLICATION FILED OCT. 10, 1917.

1,300,260.

Patented Apr. 15, 1919.
3 SHEETS—SHEET 1.

Inventor
Jacob Guth
By _____, Atty.

J. GUTH.
AGRICULTURAL TRACTOR.
APPLICATION FILED OCT. 10, 1917.

1,300,260.

Patented Apr. 15, 1919.
3 SHEETS—SHEET 3.

INVENTOR
JACOB GUTH.
By F. W. Cornwall, Atty.

UNITED STATES PATENT OFFICE.

JACOB GUTH, OF SALEM, ILLINOIS.

AGRICULTURAL TRACTOR.

1,300,260.

Specification of Letters Patent. Patented Apr. 15, 1919.

Application filed October 10, 1917. Serial No. 195,690.

*To all whom it may concern:*

Be it known that I, JACOB GUTH, a citizen of the United States, residing at Salem, Illinois, have invented a certain new and useful Improvement in Agricultural Tractors, of which the following is a full, clear, and exact description, such as will enable others skilled in the art to which it appertains to make and use the same, reference being had to the accompanying drawings, forming part of this specification.

My invention relates generally to a motor driven agricultural implement, the same being particularly designed for the breaking up and working of soil and for the cultivation of growing crops, my present invention being an improvement on the tractor, plow and cultivator combined disclosed in my application for patent filed October 28, 1916, Serial No. 128,231, and the tractor, plow, harrow and cultivator disclosed in my application filed June 22, 1917, Serial No. 176,336.

The principal objects of my present invention are, to provide simple and efficient means in the form of a pair of wheels arranged at the forward end of the main frame of the machine, and which means can be readily operated for guiding the machine in either direction laterally during its forward movement and also for turning the same completely around within a comparatively small area; to provide a firm and substantial support for the steering wheels; to connect said steering wheel support to the main frame of the machine so that the support will swing through a vertical plane upon a central horizontal axis, and further, to provide simple and efficient means whereby the steering wheels may be turned laterally either simultaneously or independently, thereby making it possible to readily steer the tractor under all conditions.

With the foregoing and other objects in view, my invention consists in certain novel features of construction and arrangement of parts, hereinafter more fully described and claimed, and illustrated in the accompanying drawings, in which—

Figure 1:
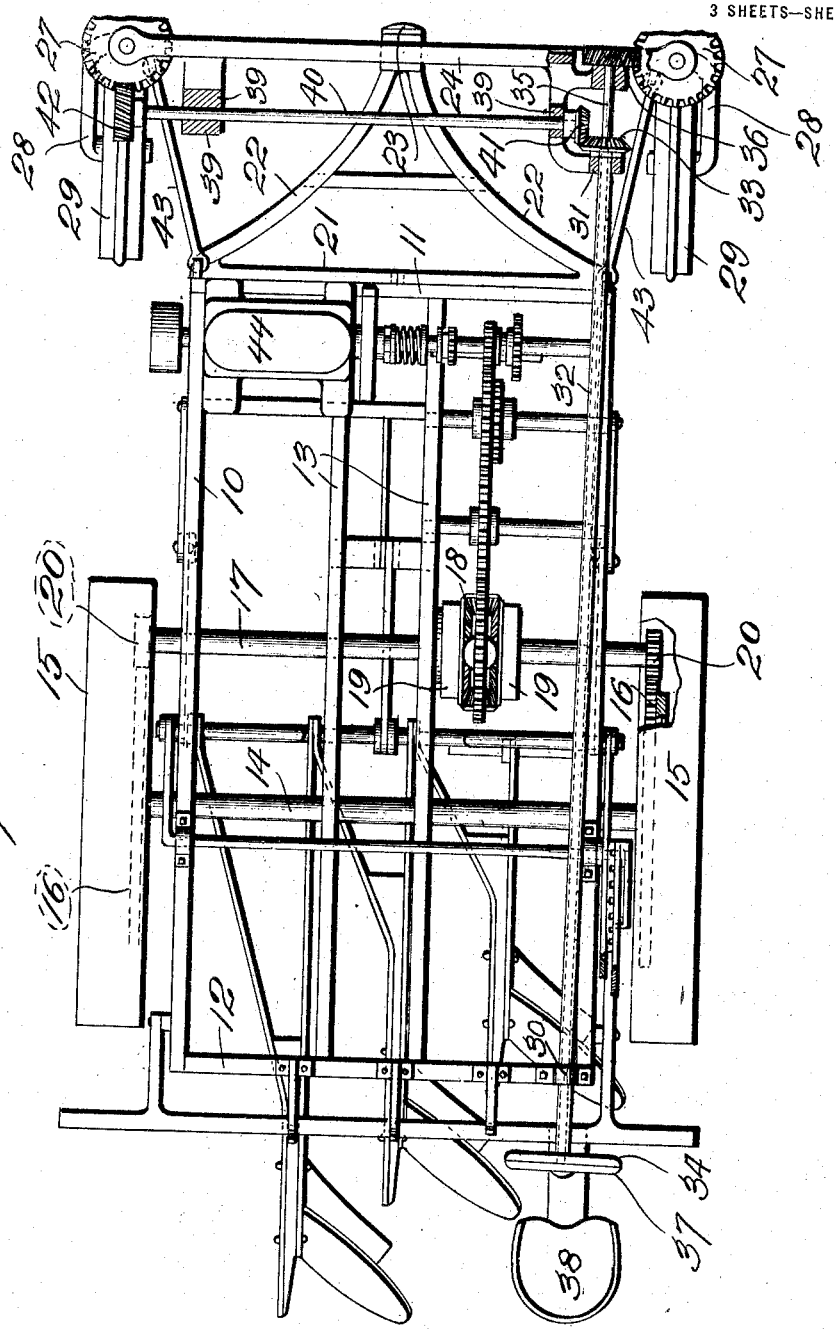
Figure 1 is a plan view of an agricultural tractor of my improved construction and showing a gang of plows associated therewith.
Figure 2:
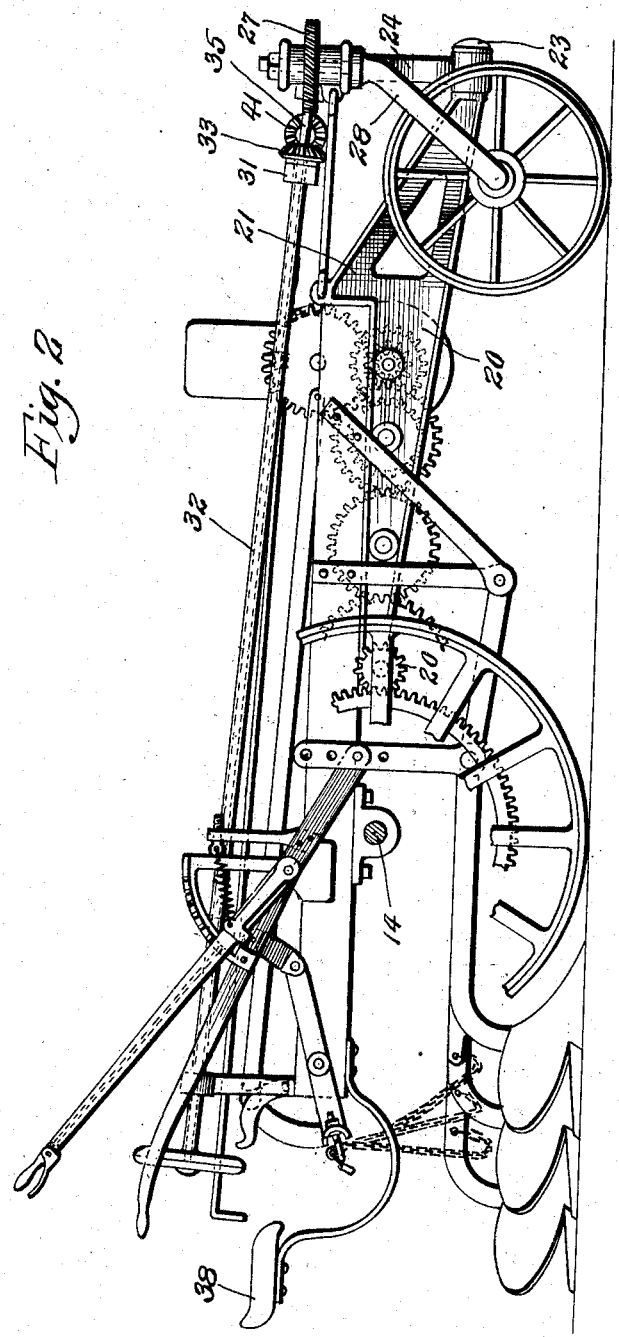
Fig. 2 is a side elevational view of the implement with the plows connected thereto, parts of said implement being broken away.

Referring by numerals to the accompanying drawings which illustrate a practical embodiment of my invention, 10 designates the side rails of the main frame of the machine, 11 the front end rail, 12 the rear end rail and 13 longitudinally disposed rails which are arranged intermediate of the side rails 10.

These rails, which are preferably channels, angle irons or I-beams, are suitably framed together and constitute the main frame of the machine. An axle 14 is positioned in suitable brackets beneath the rear portion of this main frame and loosely mounted on the ends of said axle are traction wheels 15 of any suitable construction, each traction wheel carrying on its inside a large gear wheel 16.

Arranged in suitable bearings on the underside of the central portion of the main frame is a shaft 17 formed in two parts, said parts being connected by an ordinary differential gearing 18, the same including a pair of drums 19 with which coact brake bands of the usual type (not shown), and the outer ends of the parts of this shaft carry pinions 20 which mesh with the gear wheels 16.

Figure 3:
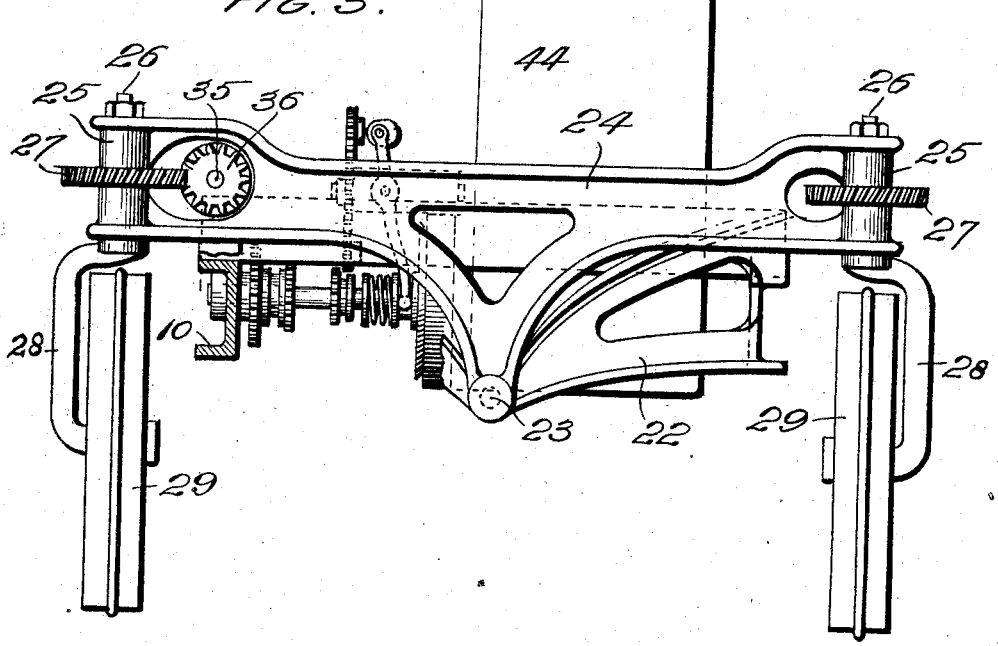
Fig. 3 is a front elevational view of the machine, parts thereof being broken away and in section.

Secured in any suitable manner to the forward portions of the side rails 10 are the side members 20 of a front end frame casting 21, the same including a pair of forwardly projecting members 22 which converge toward and unite at a point in alinement with the longitudinal center of the main frame, but in a horizontal plane slightly below the plane occupied by said main frame. Mounted on a horizontal axis 23 which is formed at the point where these arms 22 unite is a transversely disposed rail or frame 24, the end portions of which are arched upwardly, as illustrated in Fig. 3, said frame carrying the front steering wheels and the actuating mechanism thereof. The ends of this frame 24 are provided with vertically disposed bearings 25 and journaled therein are shafts 26, each of which carries a worm wheel 27.

Secured to the lower ends of the shafts 26 are downwardly and rearwardly extending arms 28 and journaled on a stub axle carried by the lower end of each arm is a steering wheel 29. Loosely mounted in a bearing 30 at the rear end of the main frame and in a bearing 31 at the right hand end of frame 24 is a tubular shaft 32, the forward end of which carries a bevel pinion 33, and the rear end carrying a hand wheel 34. Extending through this tubular shaft 32 and arranged for rotation therein is a shaft 35, the forward end of which carries a worm wheel 36, the same meshing with the corresponding worm wheel 27 which is associated with the right hand one of the steering wheels 29 and the rear end of this shaft 35 carries a hand wheel 37 which is positioned immediately adjacent to hand wheel 34.

Positioned on a suitable support which extends upwardly and rearwardly from the rear portion of the main frame of the machine and directed to the rear of hand wheels 34 and 37, is an operator's seat 38.

Journaled in suitable bearings 39 on the frame 24 is a transversely disposed shaft 40, the right hand end of which carries a bevel pinion 41 the same meshing with pinion 33 and the left hand end of this shaft carries a worm wheel 42 which meshes with the corresponding worm wheel 27, the latter being associated with the left hand one of the steering wheels 29.

Loosely connected to the outer ends of frame 24 are links 43, the inner ends of which are pivotally connected to the side of front end frame 21. These links 43 are intended to serve as flexible braces for the ends of frame 24 and to permit it to rock vertically for a limited distance upon its horizontal axis 23. Obviously, the connections between the ends of these links 43 and main frame and transverse frame 24 must be sufficiently loose to permit said frame 24 to move vertically for a certain distance.

Mounted on the front portion of the main frame of the machine and preferably on the left hand side thereof is the motor 44 which furnishes the power for driving my improved machine, said motor being preferably an internal combustion engine, the shaft of which is connected by a suitable train of gearing to shaft 17, which latter carries the pinions 20 that mesh with gear wheels 16 on the main driving wheels of the tractor.

While my improved tractor is in operation, the motion of the engine shaft is transmitted by a suitable train of gearing to differential shaft 17 and from thence through pinions 20 to gear wheels 16, which latter are carried by the main traction wheels 15.

During the forward movement of the tractor, it is guided by the operator positioned on the seat 38 and who simultaneously grasps the hand wheels 34 and 37, which latter are carried by tubular shaft 32 and shaft 35. As these shafts are simultaneously rotated, corresponding movement is simultaneously imparted through worm wheels 36 and 42 to worm wheels 27 which are carried by the upper ends of arms 28 upon which the steering wheels are journaled. Thus, the steering wheels are simultaneously and correspondingly turned to guide the tractor in its forward movement.

In the event that it is desired to turn completely around or through an arc of one hundred eighty degrees and which action would be likely to take place at the end of a field which is being plowed, the operator locks either one side or the other of the differential by application of the proper brake band on the corresponding drum 19 with the result that one of the traction wheels 15 is locked and as the engine continues in operation, the machine will turn around with the vertical center of the locked wheel as the axis of turning movement, and during this time, the operator releases the hand wheels 34 and 37, thereby permitting the steering wheels 29 to swing freely of their own accord into proper position to accomplish this short turning movement. During this turning movement, the members 28 to which the steering wheels 29 are journaled can move independently of each other by virtue of the fact that they are not positively connected and the shaft 35 within the hollow shaft 32 enables the steering connections to the front wheels to operate independently.

During the movement of the tractor over comparatively rough ground, frame 24 which carries the steering wheels can swing vertically on its horizontal pivot for a limited distance, thereby accommodating the steering wheels to the unevenness of the ground and in the event that either one of the steering wheels encounters a rut or hole and it is desired to shift said wheel laterally to assist the tractor in its forward movement, said wheel can be actuated by a manipulation of the proper hand wheel 34 or 37.

It will be readily understood that minor changes in the size, form and construction of the various parts of my improved tractor can be made and substituted for those herein shown and described, without departing from the spirit of my invention, the scope of which is set forth in the appended claims.

I claim:

1. In a machine of the class described, a frame, a transversely disposed member pivotally mounted on the front of the frame, steering wheels pivotally carried by the ends of said member, and means for shifting either one of the steering wheels laterally independently of the other.

2. In a machine of the class described, a frame, a transversely disposed member pivotally mounted on the front of the frame, steering wheels pivotally carried by the ends of said member, and steering mechanism associated with said wheels for simultaneously swinging them laterally, which steering mechanism is constructed to permit the steering wheels to swing laterally independently of each other.

3. In a machine of the class described, a frame, a secondary frame secured to the front end of the main frame and extending forwardly thereof, a transversely disposed member pivotally mounted on a horizontal axis at the front end of the secondary frame, means for limiting the vertical swinging movement of said transversely disposed member, vertically disposed shafts journaled in the ends of the transverse member, the lower portions of which shafts are extended downwardly and rearwardly, steering wheels carried by the lower portions of said shafts and means for swinging each vertically disposed shaft and the steering wheel carried thereby laterally independently of the other shaft and steering wheel.

4. In a machine of the class described, a frame, a secondary frame secured to the front end of the main frame and extending forwardly thereof, a transversely disposed member pivotally mounted on a horizontal axis at the front end of the secondary frame, vertically disposed shafts journaled in the ends of the transverse member, the lower portions of which shafts are extended downwardly and rearwardly, steering wheels carried by the lower portions of said shafts, said vertically disposed shafts being capable of independent rotary movement, and means for simultaneously imparting rotary movement to said shafts to swing the steering wheels laterally.

5. In a machine of the class described, a main frame, a member pivotally mounted on a horizontal axis at the forward end of the main frame, means for limiting the vertical swinging movement of said pivotally mounted member, independently operable steering wheel carrying members journaled in the ends of said transverse member, and manually operable means for simultaneously imparting movement to said steering wheel carrying members.

6. In a tractor, a main frame, steering wheels pivotally arranged at the front of said frame, and steering mechanism associated with said wheels for simultaneously swinging said wheels laterally, which steering mechanism is constructed so as to permit said steering wheels to swing laterally independently of each other.

7. In a tractor, a main frame, vertically disposed shafts journaled in supports adjacent to the forward end of said main frame, steering wheels carried by the lower ends of said shafts, a steering rod, connections between said rod and one of the vertically disposed shafts, a sleeve on said rod, operating connections between said sleeve and the other one of the vertically disposed shafts, and steering wheels on said steering rod and sleeve.

8. In a tractor, a main frame, traction wheels for said main frame, caster wheels arranged at the forward end of said main frame for steering the tractor, said caster wheels capable of independent lateral swinging movement, and means for positively and simultaneously swinging said caster wheels laterally.

In testimony whereof I hereunto affix my signature this 5th day of October, 1917.

JACOB GUTH.

Copies of this patent may be obtained for five cents each, by addressing the "Commissioner of Patents, Washington, D. C."